May 26, 1953 R. M. BURMEISTER 2,639,848
LUGGAGE CARRIER FOR MOTOR VEHICLES
Filed June 15, 1951 2 Sheets-Sheet 1

INVENTOR.
Robert M. Burmeister,
BY
Wilfred E. Lawson
ATTORNEY.

May 26, 1953 R. M. BURMEISTER 2,639,848
LUGGAGE CARRIER FOR MOTOR VEHICLES
Filed June 15, 1951 2 Sheets-Sheet 2
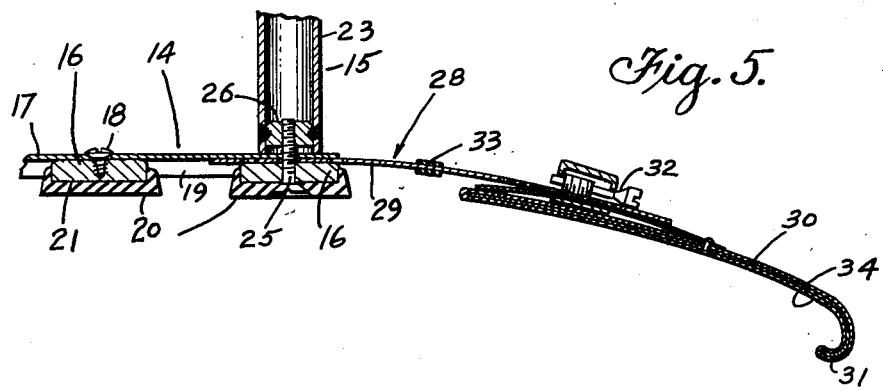
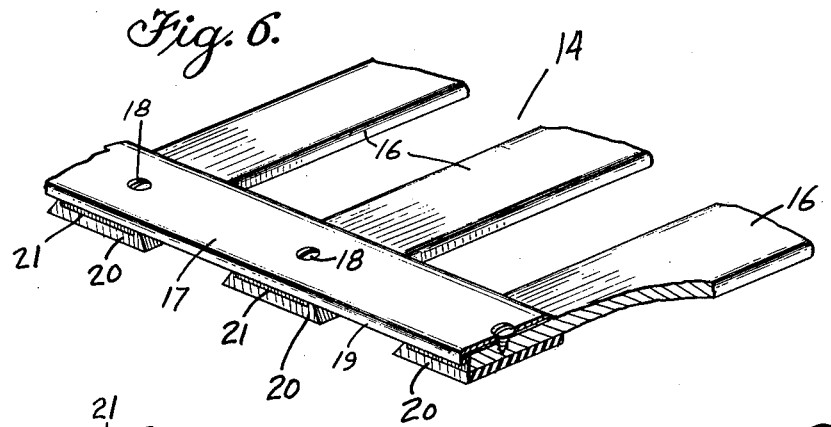
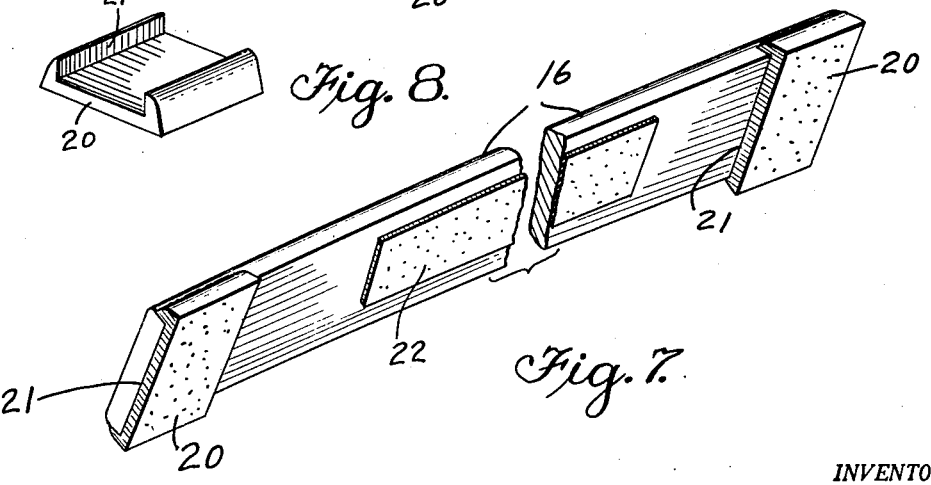
INVENTOR.
Robert M. Burmeister.
BY
Wilfred Lawson
ATTORNEY.

Patented May 26, 1953

2,639,848

UNITED STATES PATENT OFFICE 2,639,848

LUGGAGE CARRIER FOR MOTOR VEHICLES

Robert M. Burmeister, Pasadena, Calif.

Application June 15, 1951, Serial No. 231,850

3 Claims. (Cl. 224—42.1)

This invention relates to motor vehicles and more especially to a luggage carrier for the same.

An object of the invention is to provide a simple, practical and inexpensive luggage carrier of the character described.

Another object of the invention is to provide an improved luggage carrier to be carried on the top of a motor vehicle body that is adapted to fit the varying contours of the tops of a plurality of cars.

Another object of the invention is to provide an improved luggage carrier for the top of a motor vehicle body that is adapted to be detachably secured thereto without the use of conventional suction cups or other devices which ordinarily mar the finish of the body material.

An additional object of the invention is to provide an improved luggage carrier of the character described which when secured to the top of a motor vehicle body will be retained virtually against shifting when loaded.

Other objects and advantages will appear and be brought out more fully in the following specification, reference being had to the accompanying drawing.

In the drawing:

Figure 5 is a partial view in sectional elevation showing details of the fastening features of the invention.

Figure 6 is a partial perspective view of the base of the luggage carrier.

Figure 7 is a perspective view showing the underside of one of the base elements.

Figure 8 is a perspective view of one of the non-slip foot pieces which is the base.

Figure 1:
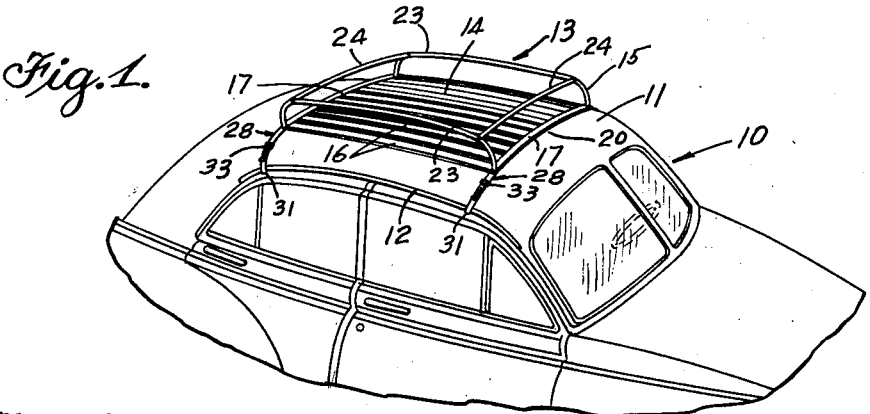
Figure 1 is a perspective view of the upper portion of a motor vehicle, showing an embodiment of the invention applied thereto.
Figure 2:
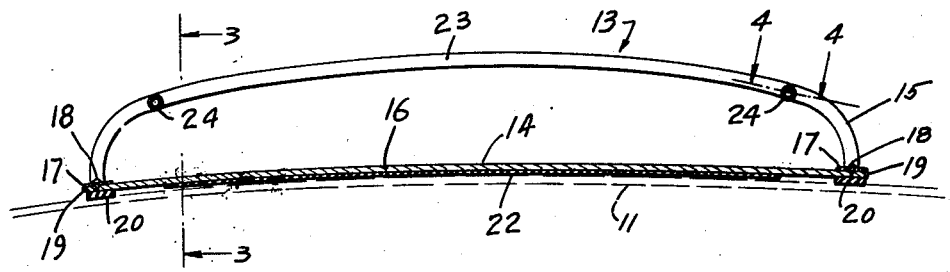
Figure 2 is a longitudinal sectional elevation of the luggage carrier shown in Figure 1.
Figure 3:
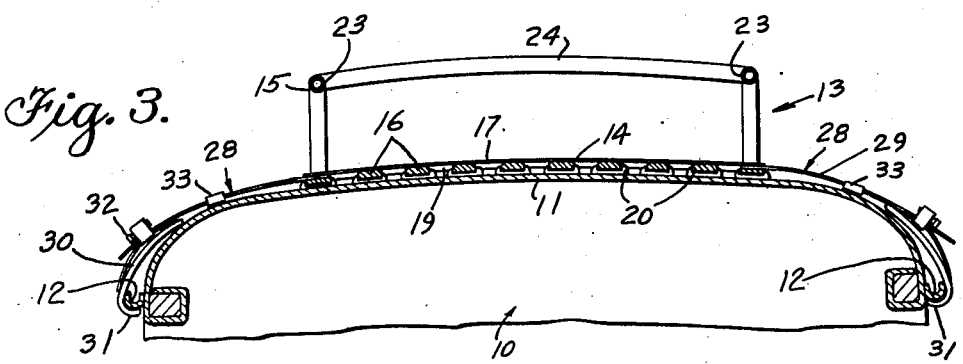
Figure 3 is a sectional view taken along the line 3—3 of Figure 2.
Figure 4:
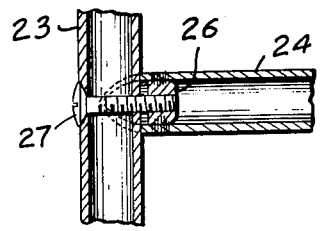
Figure 4 is an enlarged sectional view taken along the line 4—4 of Figure 2.

In the drawing the numeral 10 designates generally a motor vehicle body having a fixed top 11, which has a generally sloping contour in both directions and is of the type having rain deflecting flange elements or gutters 12 extending along the sides to protect the doors and windows. The numeral 13 designates generally the novel luggage carrier of this invention and is comprised essentially of a base 14 and a framework 15 forming a rack in which the luggage articles may be placed for transportation with the motor vehicle.

Base 14 is comprised of a plurality of longitudinally extending spaced strips 16 and a pair of end strips 17 which secure the ends of strips 16 as by screws 18. Strips 16 may be made of any suitable flexible material, such as wood, metal or the like and strips 17 will preferably be of stainless steel or the like and are preferably formed with a flanged edge 19 which serve as a stop for the ends of strips 16. A plurality of foot pieces 20 preferably of a somewhat spongy rubber are formed with channels 21 by which they may be secured to the ends of strips 16 and intermittently the end strips 16 each have a non-slip strip of sponge rubber 22 or the like.

Framework 15 comprises a pair of side members 23 and an interconnecting pair of transverse members 24 which are preferably constituted of any suitable light material such as aluminum or stainless steel tubing, the ends of wide members 23 being curved downwardly and secured to the ends of the outermost base strips 16 as by machine screws 25 which are threadedly connected to inserts 26 welded or otherwise permanently fastened at the end bores of members 23. Cross members 24 are similarly secured to side members 23 as by screws 27.

The luggage carrier is detachably fastened to the top 11 of the motor vehicle 10 by a plurality of adjustable fasteners designated generally by a numeral 28. Each fastener 28 comprises a strip of stainless steel 29 secured at the ends of end strips 17 and between the strips and outermost base strips 16 by the screws 25 as clearly shown in Figure 5. A strip 30 having a hook portion 31 for engaging body flange members or gutters 12 is secured to each strip 29 by an adjustable screw connection 32 of conventional type. Strips 29 and 30 are preferably provided with rubber elements 33 and 34 for protecting the surface finish of the top 11 of the motor vehicle. In the operation of the invention, it will be clear that the flexibility of strips 16 and 17 is such that the luggage carrier 13 may be readily and securely fastened to the tops of a plurality of motor vehicles of different dimensions and having varying top contours and that no supports or fasteners of the suction cup type are needed or employed and it will be clear that the invention as shown and described achieves the objects stated herein above.

While in the foregoing there has been shown and described the preferred form of this invention, it is to be understood that minor changes in the details of construction, combination and arrangement of parts may be resorted to without departing from the spirit and scope of the invention as claimed.

I claim:

1. A luggage carrier for application to the top of a motor vehicle, said carrier including a rectangular base comprising a plurality of spaced parallel strips, transverse end strips each lying across the ends of and connecting said spaced strips, each of said end strips having a longitudinal depending edge flange having the ends of the adjacent strips abutted thereagainst, an upstanding rectangular frame overlying the base and having downturned corner portions resting upon a transverse strip over one of the parallel strips, a securing element extending upwardly through each of the last mentioned transverse srtips and the overlying end strip into and secured to the overlying frame corner portion, and securing means at and extending outwardly from each corner of the base for connection with a side portion of the vehicle top on which the carrier is mounted.

2. A carrier as set forth in claim 1, wherein each of said securing means comprises an elongate flat flexible strip of metal having one end disposed longitudinally of an end of a transverse strip between the latter and the underlying parallel strip, a hook element and an adjustable coupling between the hook element and said metal strip, and the said securing element adjacent to the metal strip passing through and securing the metal strip to the base.

3. A carrier as set forth in claim 1, with a soft rubber foot piece lying beneath each end of each of said parallel strips, each of said foot pieces having a flat bottom face and upwardly projecting side flanges between which the adjacent strip is secured.

ROBERT M. BURMEISTER.

References Cited in the file of this patent

UNITED STATES PATENTS

| Number | Name | Date |
|---|---|---|
| 2,119,051 | Le Boeuf | May 31, 1938 |
| 2,387,779 | Strauss | Oct. 30, 1945 |

FOREIGN PATENTS

| Number | Country | Date |
|---|---|---|
| 782,775 | France | Mar. 25, 1935 |
| 866,287 | France | Apr. 21, 1941 |